Patented Oct. 2, 1951

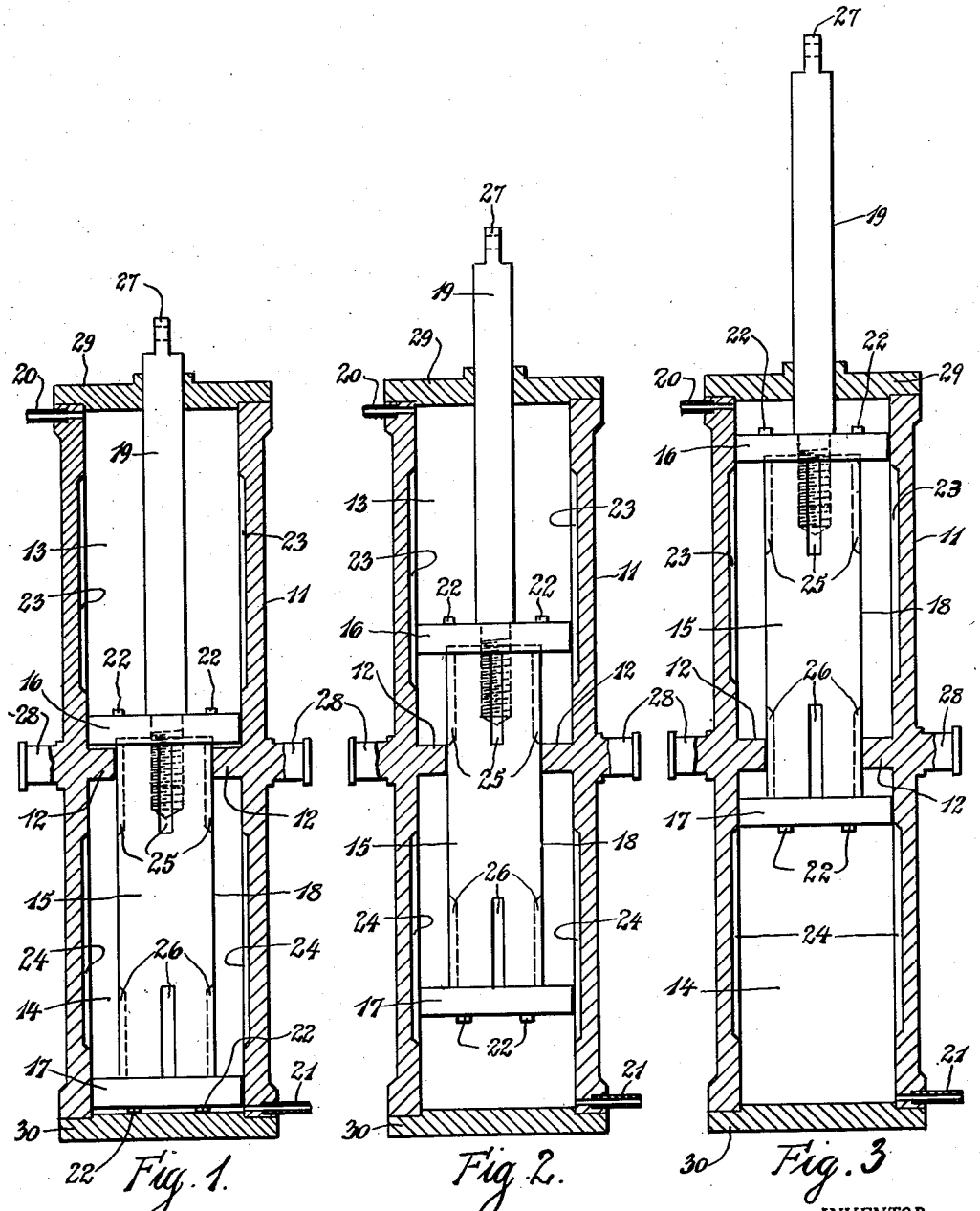

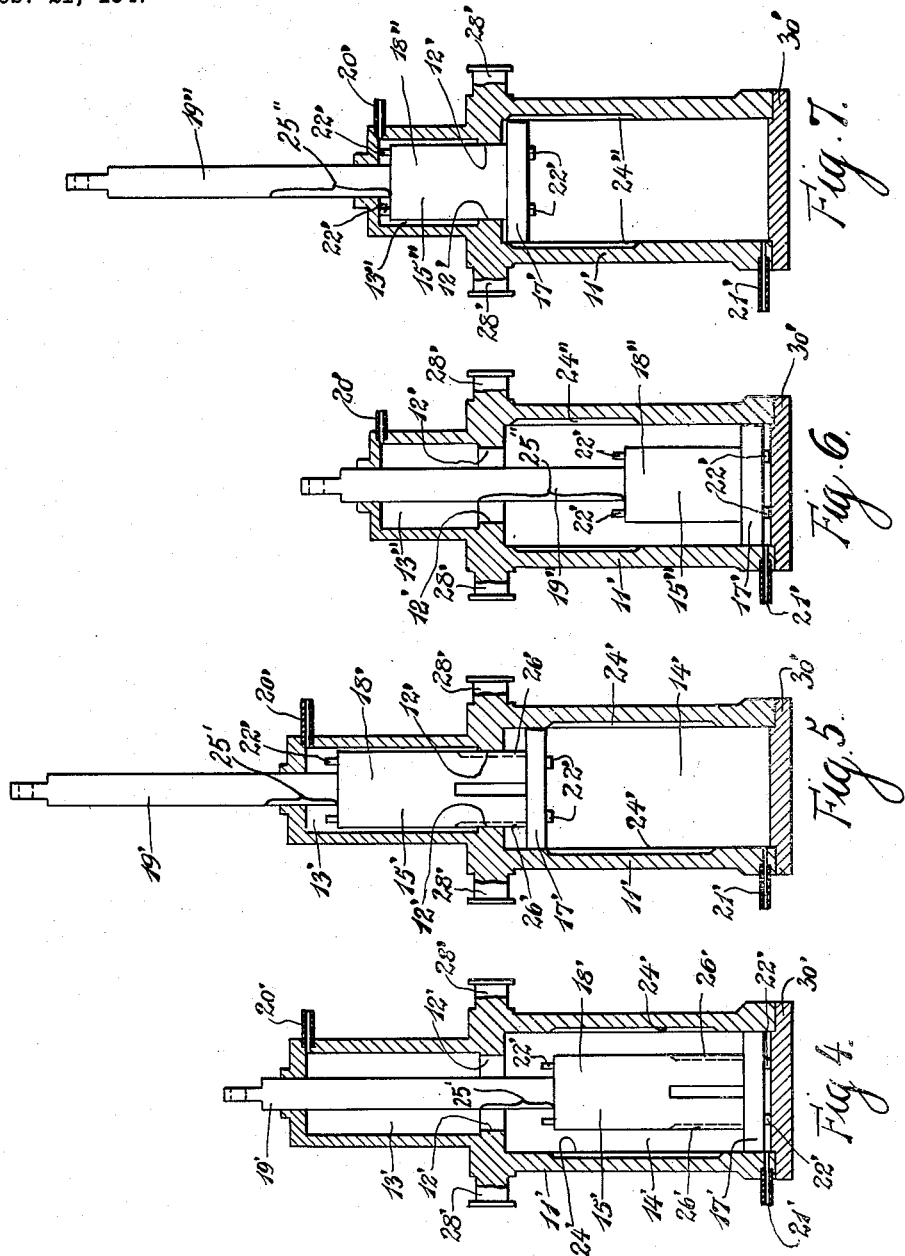

2,569,504

UNITED STATES PATENT OFFICE 2,569,504

DIFFERENTIAL CYLINDER-PISTON ASSEMBLY

John Adams Thierry, South Milwaukee, Wis., assignor to Bucyrus-Erie Company, South Milwaukee, Wis., a corporation of Delaware Application February 21, 1947, Serial No. 730,111

14 Claims. (Cl. 121—38)

Statement of invention and objects

My invention relates to new and useful improvements in double-acting differential cylinder-piston assemblies, specifically those of the type that utilize fluid by-pass grooves on the surface of the piston and/or cylinder to effect one or more changes in the force-speed ratio of the assembly at different stages of relative travel of the piston and cylinder.

A differential cylinder-piston of this type is shown in U. S. Patent No. 2,505,786, issued May 2, 1950, to George W. Mork.

In cylinder-piston assemblies of the Mork type the following problems have been encountered:

(1) To provide for motion of the piston, which is itself as long as the stroke, the cylinder enclosing such piston has been constructed twice as long as the stroke. This results in a long and cumbersome assembly which cannot be used in a confined space, and is unduly heavy.

(2) To provide for automatic change of the force-speed ratio, a hollow piston and an inner rod fixed to the cylinder have been employed. The ends of the hollow piston have sliding contact with the walls of the outer cylinder and with the surface of the inner rod, and the interior wall of the piston has sliding contact with a constriction on the rod inside the piston. Fluid by-pass grooves are located on the interior walls of the piston and on the surface of the rod. All of this is a complicated apparatus which is expensive to manufacture and difficult to assemble.

(3) To allow for functioning of the inner rod, it is necessary to make the piston rod, as well as the piston, hollow. This is not only an expensive construction but also requires use of an exhaust opening in the piston rod (to prevent build-up of pressure or vacuum therein) through which dust and dirt may pass into the inner works.

(4) Four sets of by-pass grooves are employed, one at each end of the piston and one at each end of the cylinder. This again makes for undue expense of manufacture.

Accordingly the principal object of my invention is to provide an improved by-pass type double-acting differential cylinder-piston assembly, in which:

(1) The outer cylinder is substantially less than twice the length of the stroke and the entire assembly is substantially lighter and more compact.

(2) The hollow piston and hollow piston rod are eliminated.

(3) The inner cylinder rod is eliminated.

(4) A reduced number of by-pass grooves is used in the piston and on the cylinder.

(5) Assembly and disassembly is simplified.

(6) Cost of manufacture is substantially reduced.

In addition to my principal object, above stated, I have worked out a number of novel and useful details, which will be readily evident as the description progresses.

My invention consists in the novel parts and in the combination and arrangement thereof, which are defined in the appended claims, and of which two embodiments are exemplified in the accompanying drawings, which are hereinafter particularly described and explained.

Throughout the description the same reference number is applied to the same member or to similar members.

Description of figures

Figures 1 to 3 inclusive each constitute a longitudinal section of the first embodiment of my invention, the piston assembly being shown in three successive positions, from lowest to highest, with respect to the cylinder assembly which is fixed.

Figures 4 and 5 show a second embodiment of my invention in longitudinal section, with the piston assembly shown in lowest and highest positions respectively.

Figures 6 and 7 show a second version of the second embodiment of my invention, in longitudinal section, with the piston assembly shown in lowest and highest positions respectively.

Description of first embodiment

Referring now to my first embodiment as shown in Figure 1, we see that 11 is a cylinder, having, midway between its ends, a radially inwardly projecting constriction 12 on the inner wall thereof, dividing cylinder 11 into upper and lower chambers 13 and 14 respectively. In the claims I shall employ the term "radially inwardly" to mean projecting substantially perpendicularly from the sliding contact surface of the cylinder toward the central axis thereof.

Piston 15 consists of two ends 16 and 17 which have radially outwardly sliding contact with the inside walls of chambers 13 and 14 respectively, and an intermediate constricted portion 18 which has sliding contact with the inside surface of cylinder constriction 12. Piston rod 19, extending upwardly from and integral with piston 15, extends out through a fluid-tight opening in the upper end of cylinder 11.

There are fluid ports 20 and 21 at the top and bottom respectively of cylinder 11. Stops 22 prevent the ends of piston 15 from abutting the ends of cylinder 11.

On the inner surface of chambers 13 and 14 are lengthwise grooves 23 and 24 respectively. At the upper and lower ends respectively of intermediate portion 18 of piston 15 are lengthwise grooves 25 and 26.

Grooves 23 and 24 on the cylinder and grooves 25 and 26 on the piston are so positioned relative to each other that neither grooves 25 nor grooves 26 will ever by-pass around constriction 12, unless grooves 23 and/or 24 are blocked from by-passing the upper or lower ends 16, 17 respectively of piston 15. Hence for any given position of the piston in the cylinder, only one set of by-pass grooves, i. e. the set (25 or 26) by-passing the cylinder constriction 12 or the set (23 and 24) by-passing the ends 16 and 17 of the piston, is open.

As shown in Figure 1 both ends of each set of grooves 23 and 24 of the cylinder are thus blocked by ending short of the ends of their respective chambers 13 and 14. But it can readily be seen that they would continue to operate as described, if both sets of grooves 23 and 24 were extended either all the way to the two ends of cylinder 11, or all the way to constriction 12, but not both.

It will be seen from the foregoing description that I have, in effect, two pistons, operating in two cylinders. That is to say, the axially outward faces (top and bottom respectively) of ends 16 and 17 of piston 15 constitute the two faces of a main piston, operating in a chamber the walls of which are the inner surface of chambers 13 and 14 of cylinder 11; and the intermediate constricted portion 18 of piston 15 constitutes an auxiliary piston, operating in a chamber formed by the inner surface of constriction 12 of cylinder 11.

It will be noted that the auxiliary piston, and its cooperating auxiliary chamber, have a smaller effective pressure-area, than that of the main piston and the main chamber.

Work to be actuated by my assembly can be attached to piston rod 19, as at 27, and to cylinder 11, as at 28.

The operation of my cylinder-piston assembly is as follows:

Assume the apparatus to be in the position shown in Figure 1. Pressure fluid is admitted, through port 21, into the lower end of the interior of cylinder 11, just below piston 15. Then the fluid sets up a pressure against the cross-sectional area of the lower end 17 of piston 15. Under the influence of this pressure, piston 15, and its piston rod 19, move upwardly slowly with great force.

Meanwhile the pressures in the hollow space between ends 16 and 17 of piston 15, above and below constriction 12, are equalized through grooves 25 on the upper end of intermediate portion 18 of piston 15.

Turning now to Figure 2, when piston 15 has reached the position shown in this figure, it has uncovered grooves 23 and 24 in chambers 13 and 14 respectively of cylinder 11. Fluid is now free to by-pass the lower end 17 of piston 15, through grooves 24, and the effective pressure area accordingly is merely the cross-sectional area of the intermediate portion 18 of piston 15, which is considerably less than the former pressure-area. Thus the piston 15, and its piston rod 19, now move upwardly considerably faster, and with considerably less force than in the first portion of the stroke.

Meanwhile the pressures inside upper chamber 13 of cylinder 11, above and below upper end 16 of piston 15, are partly equalized through grooves 23 in cylinder 11, and the unequalized balance is exhausted through fluid port 20 at the top of the cylinder.

This high-speed low-force travel continues until the ends 16 and 17 of piston 15 reach the ends of grooves 23 and 24 respectively and reach the position shown in Figure 3. The fluid can no longer by-pass the lower end 17 of piston 15, with the result that the initial speed-force ratio is restored. Pressures above and below constriction 12 are equalized through grooves 26 in the lower end of intermediate portion 18 of piston 15.

The reverse motion is similar, initial and final pressure being against the upper end 16 instead of the lower end 17 of piston 15. Fluid under pressure is admitted, through port 20, into the upper chamber 13 of cylinder 11, and the exhaust from the lower chamber 14 thereof passes out through port 21.

As before, the travel is slow and forceful at the beginning and end of the stroke, and is fast and less forceful at intermediate points of the travel, this being for the greater portion of the stroke.

By having piston rod 19 extend through the bottom as well as the top of cylinder 11, the initial and final force-speed ratio can be made exactly the same for travel both up and down, or the difference in the up and down ratios can be varied by changing the diameter of piston rod 19.

Since the cylinder 11 can be made in three sections consisting of a main barrel and end plates 29 and 30, and the piston 15 can similarly be made in three sections consisting of intermediate portion 18 and ends 16 and 17, it is seen that the piston can easily be assembled in the cylinder by simply inserting in the cylinder barrel the intermediate piston 18, inserting and attaching thereto the end pistons 16 and 17, attaching piston rod 19 thereto, and finally closing the cylinder by attaching end plates 29 and 30 to the cylinder barrel. Disassembly is accomplished in the reverse order, it being a simple matter to reach and inspect the inner working parts.

*Description of second embodiment*

Turning now to my second embodiment, which is shown in Figures 4 to 7 inclusive, we see a further development of my cylinder-piston assembly which further satisfies my objects by shortening the cylinder to less than twice the length of the stroke, and by eliminating two sets of by-pass grooves.

In the following description I shall use the same reference numbers as in my first embodiment but with a single prime (') added to designate parts which serve a similar function, even though they may differ in physical shape and/or construction.

The first version of this embodiment, shown in Figures 4 and 5, has, like my first embodiment, a high force-speed ratio (large effective pressure area) at the beginning and end of the stroke and a low force-speed ratio (small effective pressure area) at intermediate positions.

As before, cylinder 11' has an intermediate constriction 12', and upper and lower chambers 13' and 14', the upper chamber 13' being, however, shorter and smaller in diameter to fit the modified piston hereinafter described.

Piston 15' has been simplified to consist of two parts, namely: (1) bottom end piece 17', forming the main low-speed piston, having sliding contact with the inside surface of chamber 14' which forms the main cylinder, and (2) upper portion 18' forming the auxiliary high-speed piston having sliding contact with the inside surface of constriction 12' which forms the auxiliary cylinder. The top end piece 16 of my first embodiment has been eliminated.

As before, piston rod 19', integral with piston 15', extends upwardly through the top of cylinder 11'; fluid ports are provided at the top and bottom of the cylinder 11'; and stops 22' are placed at the ends of the piston 15'.

Only a single set of grooves 24' in lower chamber 14' and a single set of grooves 26' at the lower end of auxiliary piston 18' are employed, grooves 23 and 25 of my first embodiment having been eliminated.

Grooves 24' and 26' are so positioned relative to each other that grooves 26' will never by-pass around constriction 12', unless grooves 24' are blocked from by-passing the lower end 17' of piston 15', only one set of grooves being open at any given position of piston 15'.

Since the upper end 16 of piston 15 of my first embodiment has been eliminated, upper chamber 13' which encloses the piston in its uppermost position (Figure 5), can be made shorter than lower chamber 14' by an amount equal to the length of grooves 26' plus the thickness of end 17' of piston 15'. This is accomplished by substituting for the upper grooves 25 of the first embodiment (Figures 1 to 3) and opening 25' which is formed by cutting away or eliminating the upper end of the auxiliary piston 18' for a distance equal to the length of grooves 26', this cutaway opening thereby constituting an annular recess, which has the same by-passing function as grooves 25 of Figures 1 to 3, and having such an inner diameter that it is indistinguishable from the lower portion of the piston rod 19'. By reason of its inner diameter being equal to the diameter of the piston rod 19', recess opening 25' not only functions as a bypass around constriction 12' but also functions to permit upper chamber 13' to be made shorter by an amount equal to the length of opening 25'. Inasmuch as bypassing may be performed either by grooves (as in Figures 1 to 5) or by the annular opening or recess above described (Figures 4 to 7), or by any other suitable form of cutaway passage, I use the term "bypass means" to refer generically to any of such variants. It will be seen that if the low speed-force ratio is used for most of the stroke, the upper chamber 13' may be made only a little more than one-half the length of lower chamber 14'.

The operation of this version of my cylinder-piston assembly is similar to that of my first embodiment, except that; (1) by-passing around constriction 12' in the initial upward slow-speed motion of the piston occurs through the opening 25' at the upper end of the piston, instead of through grooves, (2) there is at all times a direct outlet to exhaust port 20' (for upward stroke) for fluid displaced by end 17' and portion 18' of the piston, and (3) end 17' of piston 15' provides the larger effective pressure area for the low-speed high-force motion for downward as well as upward motion of the piston.

Turning now to the second version of my second embodiment, as shown in Figures 6 and 7, we see that it is similar to the first version of the same embodiment, except that, instead of having low-speed travel at each end of its stroke, it has such travel only at one end, namely at the lower or retracted end of the stroke shown in Figure 6, thereby making it possible to eliminate all grooves entirely from the piston, and to shorten substantially the piston and hence the upper chamber of the cylinder without reducing the length of the stroke. Bypassing around constriction 12' during the low-speed retracted portion of the stroke is through the annular recessed opening 25'' in the same manner as the bypassing through the corresponding opening 25' in Figure 4 and the corresponding grooves 25 in Figure 1. Although the assembly in Figures 6 and 7 shows a low-speed travel for one-half the stroke, and accordingly an upper chamber of equal length, it is evident that by increasing the amount of low-speed travel, I can shorten the upper cylinder chamber in direct proportion, thereby achieving an even more compact cylinder.

It should also be noted that, in both versions of my second embodiment, the upper chamber of the cylinder is also smaller in diameter than the lower chamber since it encloses only the constricted portion of the piston.

Having now described and illustrated two forms of my invention, I wish it to be understood that my invention is not to be limited to the specific form or arrangement of parts herein described and shown.

Thus it is evident that each of my embodiments can readily be built with one, two, or more speed changes, with the different speeds arranged in various orders of occurrence along the stroke, with different relative speeds by altering relative dimensions of piston and cylinder elements, and with the piston rod fixed to either one or both ends of the piston assembly, without departing from the objects of my invention.

I claim:

1. In a differential double-acting cylinder-piston assembly, the combination of: cylinder means, comprising an unconstricted portion and a radially inwardly constricted portion; piston-means, comprising main piston means having fluid-sealed sliding contact with the unconstricted portion of the cylinder means, and auxiliary piston means constrained to reciprocate with the main piston means and having fluid-sealed sliding contact with the constricted portion; means for the introduction of pressure-fluid into the cylinder means, to cause relative reciprocation of the piston means in one direction; means for the introduction of pressure-fluid into the cylinder means, to cause relative reciprocation of the piston means in the other direction; by-pass means, to break the fluid seal between the main piston means and the unconstricted portion of the cylinder means, and automatically rendered effective by the relative position of the piston means and the cylinder means during a part of the relative reciprocation of the piston means in each direction, and automatically rendered ineffective by the relative position of the piston means and the cylinder means during another part of the relative reciprocation of the piston means in each direction; by-pass means to break the fluid seal between the auxiliary piston means and the constricted portion of the cylinder means, and automatically rendered effective by the relative position of the piston means and the cylinder means during a part of the relative reciprocation of the piston means in each direction, and automatically rendered ineffective by the relative position of the piston means and the cylinder means during another part of the relative reciprocation of the piston means in each direction; whereby the main piston means is relieved of fluid pressure and the auxiliary piston means is subjected to fluid pressure during a portion of the reciprocation in each direction, and the auxiliary piston means is relieved of fluid pressure and the main piston means is subjected to fluid pressure during another portion of the reciprocation in each direction.

2. A differential double-acting cylinder-piston assembly according to claim 1, further characterized by the fact that the two portions of the cylinder means together constitute a single continuous chamber, and that the constricted portion of the cylinder means comprises a constriction projecting radially inwardly from the wall of this chamber.

3. A differential double-acting cylinder-piston assembly according to claim 2, further characterized by the fact that the constriction divides the chamber into two portions.

4. A differential double-acting cylinder-piston assembly according to claim 3, further characterized by the fact that the two portions of the chamber have substantially the same bore; that the auxiliary piston means is of a relatively small diameter and of a length approximately as long as its travel; and that the main piston means consists of two piston heads, one of which is on one end of the auxiliary piston means, and the other of which is on the other end of the auxiliary piston means.

5. A differential double-acting cylinder-piston assembly according to claim 4, further characterized by the fact that the second-mentioned by-pass means comprises at least one duct extending from one point on the outer surface of the auxiliary piston means to another point thereon longitudinally spaced from the first point, said duct being effective when these two points bracket the constriction, and ineffective when these two points do not bracket the constriction; and that the first-mentioned by-pass means comprises at least one duct extending from one point on the inner surface of the chamber to another point thereon longitudinally spaced from the first point, said duct being effective when these two points bracket one of the piston heads, and ineffective when these two points do not bracket one of the piston heads.

6. A differential double-acting cylinder-piston assembly according to claim 5, further characterized by the fact that the second-mentioned by-pass means comprises two sets of such ducts, each set including at least one duct, one set being at one end of the auxiliary piston means, and the other set being at the other end of the auxiliary piston means; and that the first-mentioned by-pass means comprises two sets of such ducts, each set including at least one duct, one set being located about midway of one portion of the chamber, and the other set being located about midway of the other portion of the chamber.

7. A differential double-acting cylinder-piston assembly according to claim 1, further characterized by the fact that the first-mentioned by-pass means comprises at least one duct extending from one point on the inner surface of the cylinder means to another point thereon longitudinally spaced from the first point, said duct being effective when these two points bracket the main piston means, and ineffective when these two points do not bracket the main piston means.

8. A differential double-acting cylinder-piston assembly according to claim 7, further characterized by the fact that the second-mentioned by-pass means comprises at least one duct extending from one point on the outer surface of the auxiliary piston means to another point thereon longitudinally spaced from the first point, said duct being effective when these two points bracket the constriction, and ineffective when these two points do not bracket the constriction.

9. A differential double-acting cylinder-piston assembly according to claim 1, further characterized by the fact that the two portions of the cylinder means together constitute a single continuous chamber, and that the constricted portion of the cylinder means comprises a constriction projecting radially inwardly from the wall of this chamber, thereby dividing the chamber into two portions; that the auxiliary piston means is of a relatively small diameter; and that the main piston means comprises a piston head on one end of the auxiliary piston means.

10. A differential double-acting cylinder piston assembly according to claim 9, further characterized by the fact that the first-mentioned by-pass means comprises at least one duct extending from one point on the inner surface of that portion of the chamber in which the piston head travels, to another point thereon longitudinally spaced from the first point, said duct being effective when these two points bracket the piston head, and ineffective when these two points do not bracket the piston head.

11. A differential double-acting cylinder-piston assembly according to claim 10, further characterized by the fact that the second-mentioned by-pass means includes also at least one duct extending from one point on the outer surface of the auxiliary piston means adjacent the piston head, to another point thereon longitudinally spaced from the first point, said duct being effective when these two points brackets the constriction, and ineffective when these two points do not bracket the constriction; and that the first-mentioned by-pass means is located adjacent the constriction.

12. A differential double-acting cylinder-piston assembly according to claim 1, further characterized by the fact that the two portions of the cylinder means together constitute a single continuous chamber, and that the constricted portion of the cylinder means comprises a constriction projecting radially inwardly from the wall of this chamber, thereby dividing the chamber into two portions; that the auxiliary piston means is of a relatively small diameter; that the main piston means comprises a piston head on one end of the auxiliary piston means; and that the second-mentioned by-pass means includes having the auxiliary piston means sufficiently short to that in part of its travel it will be clear of the constriction.

13. A differential double-acting cylinder-piston assembly, according to claim 12, further characterized by the fact that the first-mentioned by-pass means is located about midway of that portion of the chamber in which the piston head travels, and consists of at least one duct extending from one point on the inner surface of the chamber, to another point longitudinally spaced from the first point, said duct being effective when these two points bracket the piston head, and ineffective when these two points do not bracket the piston head.

14. A differential double-acting cylinder-piston assembly according to claim 1 further characterized by the fact that the two portions of the cylinder means together constitute a single continuous chamber, and that the constricted portion of the cylinder means comprises a constriction projecting radially inwardly from the wall of this chamber, thereby dividing the chamber into two portions; that the auxiliary piston means is of a relatively small diameter, and is sufficiently short so that in part of its travel it will be clear of the constriction, thereby constituting at least a part of the second-mentioned by-pass means; and that the main piston means is adjacent one end only of the auxiliary piston means.

JOHN ADAMS THIERRY.

REFERENCES CITED

The following references are of record in the file of this patent:

UNITED STATES PATENTS

| Number | Name | Date |
| --- | --- | --- |
| 1,551,372 | Crocker | Aug. 25, 1923 |
| 1,966,608 | Cardwell | July 17, 1934 |
| 2,463,537 | Hoar et al. | Mar. 8, 1949 |